United States Patent
Jung et al.

(10) Patent No.: US 10,183,568 B2
(45) Date of Patent: Jan. 22, 2019

(54) HYBRID DRIVE SYSTEM

(71) Applicant: Bayerische Motoren Werke Aktiengesellschaft, Munich (DE)

(72) Inventors: Alexandre Jung, Munich (DE); Hans Glonner, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/477,362

(22) Filed: Apr. 3, 2017

(65) Prior Publication Data

US 2017/0203644 A1 Jul. 20, 2017

Related U.S. Application Data

(63) Continuation of application No. PCT/EP2015/074942, filed on Oct. 28, 2015.

(30) Foreign Application Priority Data

Nov. 3, 2014 (DE) ........................ 10 2014 222 359

(51) Int. Cl.
*B60K 6/442* (2007.10)
*B60K 6/38* (2007.10)
(Continued)

(52) U.S. Cl.
CPC ................ *B60K 6/442* (2013.01); *B60K 6/26* (2013.01); *B60K 6/365* (2013.01); *B60K 6/38* (2013.01);
(Continued)

(58) Field of Classification Search
CPC . B60K 1/00; B60K 1/02; B60K 6/442; B60K 6/445; B60K 6/26; B60K 6/365;
(Continued)

(56) References Cited

U.S. PATENT DOCUMENTS

| 5,048,635 A | 9/1991 | Wakabayashi et al. |
| 6,132,332 A | 10/2000 | Yasui |

(Continued)

FOREIGN PATENT DOCUMENTS

| CN | 101628543 A | 1/2010 |
| CN | 103373215 A | 10/2013 |

(Continued)

OTHER PUBLICATIONS

International Search Report (PCT/ISA/210) issued in PCT Application No. PCT/EP2015/074942 dated Mar. 23, 2016 with English translation (Six (6) pages).

(Continued)

*Primary Examiner* — James A Shriver, II
*Assistant Examiner* — James J Triggs
(74) *Attorney, Agent, or Firm* — Crowell & Moring LLP (57) ABSTRACT

A drive system is provided for a motor vehicle having: a first wheel pair driven by an internal combustion engine and an electric motor; a second wheel pair driven by an electric motor; an internal combustion engine which is coupled to the first wheel pair; a generator which can be operated as an electric motor and which is coupled to the internal combustion engine and the first wheel pair; and an electric motor which is coupled to the second wheel pair and is set up to convert energy produced by the generator into mechanical energy. A planetary gear is provided which is used to couple the internal combustion engine to the generator and the first wheel pair.

11 Claims, 5 Drawing Sheets

(51) Int. Cl.
  *B60K 6/445* (2007.10)
  *B60K 6/52* (2007.10)
  *B60K 17/02* (2006.01)
  *B60K 17/354* (2006.01)
  *B60K 17/356* (2006.01)
  *F16H 3/72* (2006.01)
  *B60K 6/26* (2007.10)
  *B60K 6/365* (2007.10)
  *B60K 1/00* (2006.01)

(52) U.S. Cl.
  CPC ............... *B60K 6/445* (2013.01); *B60K 6/52* (2013.01); *B60K 17/02* (2013.01); *B60K 17/354* (2013.01); *B60K 17/356* (2013.01); *F16H 3/724* (2013.01); *B60K 2001/001* (2013.01); *B60K 2006/268* (2013.01); *B60Y 2200/92* (2013.01); *B60Y 2400/421* (2013.01); *F16H 2200/2005* (2013.01); *F16H 2200/2035* (2013.01); *Y10S 903/91* (2013.01)

(58) Field of Classification Search
  CPC .......... B60K 66/38; B60K 6/52; B60K 17/00; B60K 17/02; B60K 17/354
  See application file for complete search history.

(56) References Cited

U.S. PATENT DOCUMENTS

| | | | |
|---|---|---|---|
| 6,318,533 | B1 | 11/2001 | Krisher |
| 6,383,114 | B1 | 5/2002 | Hoshiya et al. |
| 6,569,055 | B2 * | 5/2003 | Urasawa ................ B60K 6/383 180/65.225 |
| 9,199,637 | B1 * | 12/2015 | Kim ....................... B60W 10/10 |
| 9,834,093 | B2 * | 12/2017 | Hashimoto ............... B60L 1/00 |
| 2002/0057582 | A1 | 5/2002 | Nakayama et al. |
| 2002/0112934 | A1 | 8/2002 | Karambelas et al. |
| 2003/0136567 | A1 | 7/2003 | Wherry |
| 2008/0254936 | A1 * | 10/2008 | Yang ........................ B60K 1/02 477/5 |
| 2011/0257826 | A1 * | 10/2011 | Yu ........................... B60K 6/448 701/31.4 |
| 2013/0281242 | A1 | 10/2013 | Tolkacz et al. |
| 2013/0289810 | A1 | 10/2013 | Holmes et al. |
| 2014/0243149 | A1 | 8/2014 | Holmes et al. |
| 2015/0099606 | A1 | 4/2015 | Choi et al. |

FOREIGN PATENT DOCUMENTS

| | | |
|---|---|---|
| CN | 103373220 A | 10/2013 |
| DE | 199 23 970 A1 | 12/1999 |
| DE | 100 49 514 A1 | 7/2001 |
| DE | 100 12 221 A1 | 10/2001 |
| DE | 10 2013 207 341 A1 | 10/2013 |
| DE | 10 2014 101 733 A1 | 8/2014 |
| DE | 10 2013 114 871 A1 | 4/2015 |
| GB | 2 236 727 A | 4/1991 |
| WO | WO 2012/079827 A1 | 6/2012 |

OTHER PUBLICATIONS

German-language Written Opinion (PCT/ISA/237) issued in PCT Application No. PCT/EP2015/074942 dated Mar. 23, 2016 (Five (5) pages).

German-language Search Report issued in counterpart German Application No. 10 2014 222 359.8 dated Jun. 30, 2015 with partial English translation (Twelve (12) pages)

Chinese Office Action issued in Chinese counterpart application No. 201580043906.4 dated Jun. 29, 2018, with English translation (Sixteen (16) pages).

* cited by examiner

HYBRID DRIVE SYSTEM

CROSS REFERENCE TO RELATED APPLICATIONS

This application is a continuation of PCT International Application No. PCT/EP2015/074942, filed Oct. 28, 2015, which claims priority under 35 U.S.C. § 119 from German Patent Application No. 10 2014 222 359.8, filed Nov. 3, 2014, the entire disclosures of which are herein expressly incorporated by reference.

BACKGROUND AND SUMMARY OF THE INVENTION

The present invention relates to a drive system for a motor vehicle. Commercially available electric vehicles are distinguished by the fact that they can cover only a small range with one battery charge. Therefore, systems are increasingly offered which have a range extender (REX). This is generally a classic reciprocating piston internal combustion engine which drives a generator. The generated electrical energy is available to the drive system either directly or indirectly by buffering in an electrochemical battery. The range extender serves here to generate electrical energy and not to drive the vehicle directly.

In addition, there are so-called plug-in hybrid vehicles (PHEV). These also have an electric motor and a reciprocating piston internal combustion engine. However, these two units are generally coupled by means of a complex gear mechanism and, as a result, are able to drive the vehicle directly.

Electric vehicles with REX are so-called serial hybrids. The internal combustion engine is not directly used for propulsion here but instead charges the energy store via a generator. In this context, energy conversion losses are incurred since the mechanical power of the internal combustion engine is firstly converted by the generator into electrical power, and the electrical power is subsequently converted again into mechanical power by the electric traction motor. If the generated electrical energy is buffered, the efficiency level of the energy store must also be taken into account here.

In the case of PHEV vehicles, the internal combustion engine can drive the vehicle directly, but this usually requires a very complex gear mechanism in order to adapt the characteristic of the internal combustion engine to the driving function. These gear mechanisms are usually heavy and require a large amount of installation space.

DE 100 12 221 A1 discloses a hybrid vehicle with an internal combustion engine for driving a first axle and two electric machines for driving the first axle and a further axle.

Taking this prior art as a basis, an object of the present invention is to provide an improved drive system for a motor vehicle.

This and other objects are achieved by a drive system for a motor vehicle, a method of operating the drive system, as well as a vehicle equipped with the drive system, in accordance with embodiments of the invention.

According to one aspect, a drive system according to the invention for a motor vehicle has a first wheel pair driven by an internal combustion engine and an electric motor, a second wheel pair driven by an electric motor, the internal combustion engine which is coupled to the first wheel pair, a generator which can be operated as the electric motor and is coupled to the internal combustion engine and to the first wheel pair, and the electric motor which is coupled to the second wheel pair and is configured to convert energy generated by the generator into mechanical energy. In addition, a planetary gear mechanism is provided via which the internal combustion engine is coupled to the generator and to the first wheel pair.

The electric motor and the generator are preferably embodied as an asynchronous motor (ASM) or as a permanently excited synchronous machine (PSM). As a result, both can be operated either as a generator for generating energy or for the purpose of generating torque.

The internal combustion engine is coupled to the generator and to the output via the planetary gear mechanism. This arrangement makes it possible to transmit mechanical power to the output in a variable fashion. In this context, the rotational speeds of the internal combustion engine and of the generator can be varied. This degree of freedom permits particularly flexible adaptation of the electrical power provided by the generator to the demand of the on-board electrical power system.

The innovation consists, in particular, also in the arrangement of the individual components. The electric motor which is preferably arranged on the rear axle, i.e. the second wheel pair, can be embodied similarly to the manner in a pure electric vehicle. As a result, cost-effective standard solutions can be used here. By preferably adding the drive of the first wheel pair, which is based on an internal combustion engine, for example on the front axle, the possibility is provided of both extending the range of the vehicle with a low consumption of fuel, and of making available additional drive power. Both the consumption and the driving power can be improved compared to a classic electric drive by making the drive act on the first wheel pair. If the drive on the first wheel pair is dispensed with, a fully functionally capable drive is still available, which provides advantages in terms of the modularity.

The drive of the first wheel pair is preferably configured in such a way that it is possible to drive without difficulty at constant speeds up to the maximum speed and also with relatively low accelerations. This drive is therefore suitable for electric vehicles which travel over relatively large distances. Extremely small internal combustion engine power levels and generator power levels (coverage of the basic drive load) are already sufficient for this. When there is a high driving dynamic, the preferably relatively strong electric motor at the second wheel pair is then used. The drive system also provides the advantage that an all-wheel vehicle can preferably be implemented on the basis of a purely rear-wheel-drive vehicle.

According to one advantageous refinement of the drive system according to the invention, the first wheel pair is assigned to a front drive axle, and the second wheel pair is assigned to a rear drive axle. This provides the advantage that the assemblies which are assigned to the internal combustion engine, even the generator, can be accommodated in the front of the vehicle in the engine compartment, while only the relatively compact electric motor is accommodated at the rear. As a result, space advantages can be implemented.

According to a further advantageous refinement of the drive system according to the invention, a battery for storing and outputting energy is provided connected to the generator and the electric motor. As a result, better uncoupling of the generation of energy by the generator and the provision of drive torque by the electric motor can be implemented. A temporarily relatively low generation of energy by the generator, for example owing to a switchover process, can be compensated so that energy can be continuously retrieved by the electric motor.

According to a further advantageous refinement of the drive system according to the invention, a first brake is provided for braking, in particular securing, a ring gear of the planetary gear mechanism. As a result, the internal combustion engine can be particularly easily started by the generator. The first brake is embodied, for example, as a dog clutch, which permits freedom from slip in the closed state and also low frictional losses in the opened state.

According to a further advantageous refinement of the drive system according to the invention, a second brake is provided for braking, in particular securing, a web element of the planetary gear mechanism. This permits the generator to be able to be used additionally in the case of electric driving for driving the vehicle. This additional element additionally permits a recuperative braking torque by way of the generator on the first wheel pair, preferably on the front axle.

According to a further advantageous refinement of the drive system according to the invention, an uncoupling device is provided which is connected between the internal combustion engine and the first wheel pair. In the purely electric mode of operation, it is possible to uncouple the drive of the first wheel pair by way of the uncoupling device. This has the advantage that frictional losses which arise as a result of the driving of the elements in the planetary gear mechanism, for example the generator, are eliminated. This increases the efficiency level and makes it possible to implement a range in the electric driving mode which is only slightly restricted compared to a pure electric vehicle. The uncoupling device can be embodied as a dog clutch. As a result, the drag losses when the clutch is open can be minimized. The uncoupling device is preferably assigned to the first wheel pair and intermediately connected between the first differential and the first wheel pair. The uncoupling device can preferably be provided as a wheel hub clutch on the first wheel pair, which is advantageous with respect to moved masses, because the differential and the corresponding shafts are deactivated and a particularly large number of components can be deactivated by way of the uncoupling device. In addition, the uncoupling device can preferably be intermediately connected between the internal combustion engine and a first differential provided assigned to the first wheel pair, which permits relatively favorable utilization of the installation space to be achieved.

According to a further advantageous refinement of the drive system according to the invention, the generator is additionally embodied as a starter for the internal combustion engine. As a result, it is possible to dispense with an additional starter for starting the internal combustion engine. This is advantageous in terms of saving installation space, reducing the weight of the vehicle and reducing the vehicle costs. For this purpose, uncoupling is preferably carried out by way of the wheel hub clutch, and the first brake is closed and the second brake opened.

According to a further advantageous refinement of the drive system according to the invention, the drive system can preferably be switched into at least the following modes of operation: driving only the second wheel pair by use of the electric motor, wherein the internal combustion engine is uncoupled from the first wheel pair by way of the uncoupling device; driving the first wheel pair by use of the internal combustion engine or driving the first wheel pair by use of the internal combustion engine and driving the second wheel pair by use of the electric motor; driving the generator by use of the internal combustion engine, wherein the first wheel pair is uncoupled from the internal combustion engine by way of the uncoupling device, and the second wheel pair is uncoupled from the electric motor; and driving both wheel pairs by way of the electric motor and the generator, wherein the second brake is closed.

The aspects of the invention described above and the associated advantageous refinements of the drive system according to the invention also apply correspondingly, and vice versa, to the aspects of a vehicle described below, the method according to the invention and the advantageous refinements thereof.

A vehicle according to the invention has a drive system as described above.

According to one aspect, a method for operating a drive system has at least the following modes of operation: driving only the second wheel pair by use of the electric motor, wherein the internal combustion engine is uncoupled from the first wheel pair by way of the uncoupling device; driving the first wheel pair by use of the internal combustion engine or driving the first wheel pair by use of the internal combustion engine and driving the second wheel pair by use of the electric motor; driving the generator by use of the internal combustion engine, wherein the first wheel pair is uncoupled from the internal combustion engine by way of the uncoupling device, and the second wheel pair is uncoupled from the electric motor; and driving the first wheel pair by use of the electric motor and the second wheel pair by use of the generator, wherein the second brake is closed.

According to one advantageous refinement, in the mode of operation of driving the first wheel pair by use of the internal combustion engine or driving the first wheel pair by use of the internal combustion engine and driving the second wheel pair by use of the electric motor, the outputting of energy by the generator is controlled by adjusting the rotational speed of the internal combustion engine. This permits particularly flexible adaptation of the electrical power which is provided by the generator to the demand of the on-board electrical power system.

Further possible implementations of the invention also include combinations, not explicitly specified, of features which are described above or below with respect to the exemplary embodiments. In this context, the person skilled in the art would also add individual aspects as improvements or additions to the respective basic form of the drive system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
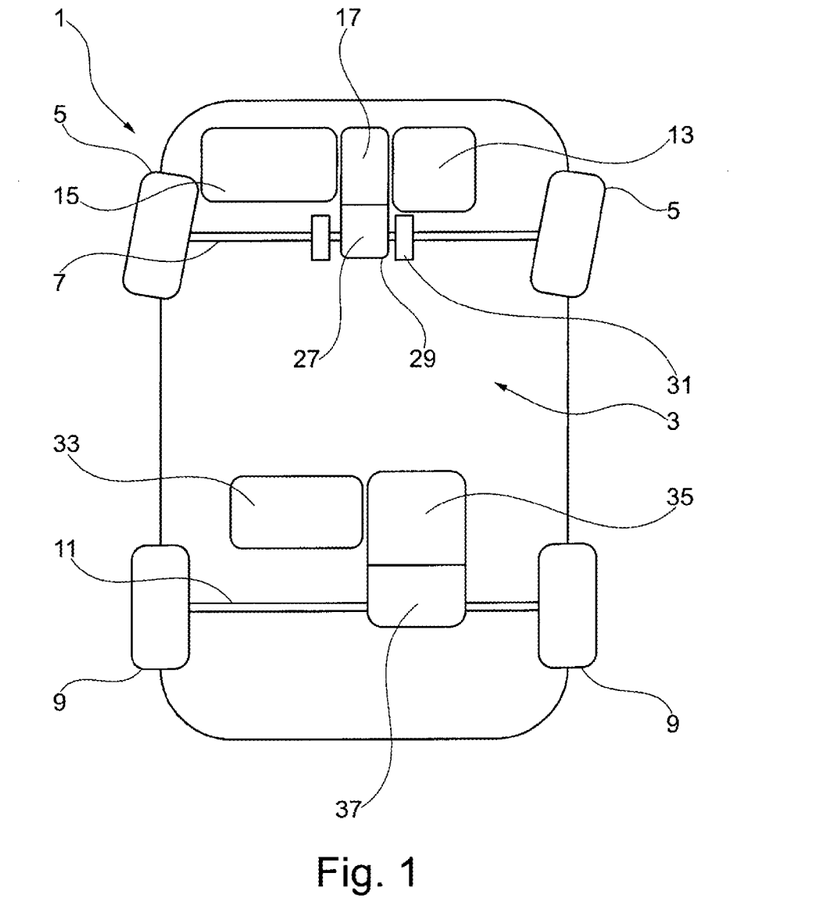
FIG. 1 is a schematic diagram of a motor vehicle with a drive system according to a first exemplary embodiment.

FIG. 1 shows a schematic illustration of a motor vehicle 1 with a drive system 3 according to a first exemplary embodiment.

The motor vehicle 1 is outlined therein as a sketch of a rounded rectangle. A first wheel pair 5 is illustrated in the figure at the top and is assigned to a front drive axle 7 of the vehicle 1. A second wheel pair 9 is illustrated further below in the figure and is assigned to a rear drive axle 11.

An internal combustion engine 13 is illustrated upstream of the front drive axle 7 and is provided for driving the first wheel pair 5. A generator 15 is coupled to the internal combustion engine 13 in order to generate electrical energy. A planetary gear mechanism (epicyclic gear mechanism) 17, a first downstep gear mechanism 27 and a first differential 29 are preferably arranged between the internal combustion engine 13 and the generator 15, which serve to distribute torque and/or rotational speed between the internal combustion engine 13, the first wheel pair 5 and the generator 15. The output torque of the internal combustion engine 13 is preferably transmitted to the first wheel pair 5 and the generator 15 by way of the planetary gear mechanism 17.

The planetary gear mechanism 17 preferably acts as a distributor gear mechanism which distributes the power of the internal combustion engine 13 between the first wheel pair 5 and the generator 15.

To the left and right of the first differential 29, an uncoupling device 31 is illustrated as two rectangles. The uncoupling device 31 serves to uncouple the internal combustion engine 13 from the first wheel pair 5, and is embodied as a dog clutch in this exemplary embodiment.

The rear drive axle 11 is assigned an electric motor 33 for driving the second wheel pair 9. The electric motor 33 is also configured in this exemplary embodiment to be operated as a generator for generating energy. A second gear mechanism 35 and a second differential 37 are preferably provided for distributing torque and/or rotational speed between the electric motor 33 and the second wheel pair 9.

During operation, the motor vehicle 1 can preferably be driven both by way of the internal combustion engine 13 via the first wheel pair 5 and by way of the electric motor 33 via the second wheel pair 9. In addition, the generator 15 can preferably be operated as an electric motor and can also provide a drive torque for the motor vehicle 1 via the planetary gear mechanism 17, the first downstep gear mechanism 27 and the first differential 29.

Instead of being directly connected to the generator 15, in this exemplary embodiment the internal combustion engine 13 is preferably coupled to the generator 15 and the output, i.e. the first wheel pair 5, via the planetary gear mechanism 17. By way of this arrangement, part of the drive power of the internal combustion engine 13 can be made available for driving the first wheel pair 5, while its further drive power can be used to drive the generator 15. In this context, the rotational speeds of the internal combustion engine 13 and of the generator 15 can be varied. This variability permits the electrical power provided by the generator 15 to be adapted to the demand of the on-board power system.

In addition, in the purely electric mode of operation of the drive system 3 it is possible to uncouple the drive of the first wheel pair 5 by way of the uncoupling device 31. This provides the advantage that frictional losses which are caused by the movement of the elements in the planetary gear mechanism 17 are eliminated. As a result, the range of the motor vehicle 1 can be increased.

In this exemplary embodiment, the generator 15 is also configured to start the internal combustion engine 13. As a result, an additional starter for the internal combustion engine 13 can be eliminated, which is advantageous in respect of installation space, vehicle weight and costs.

Figure 2:
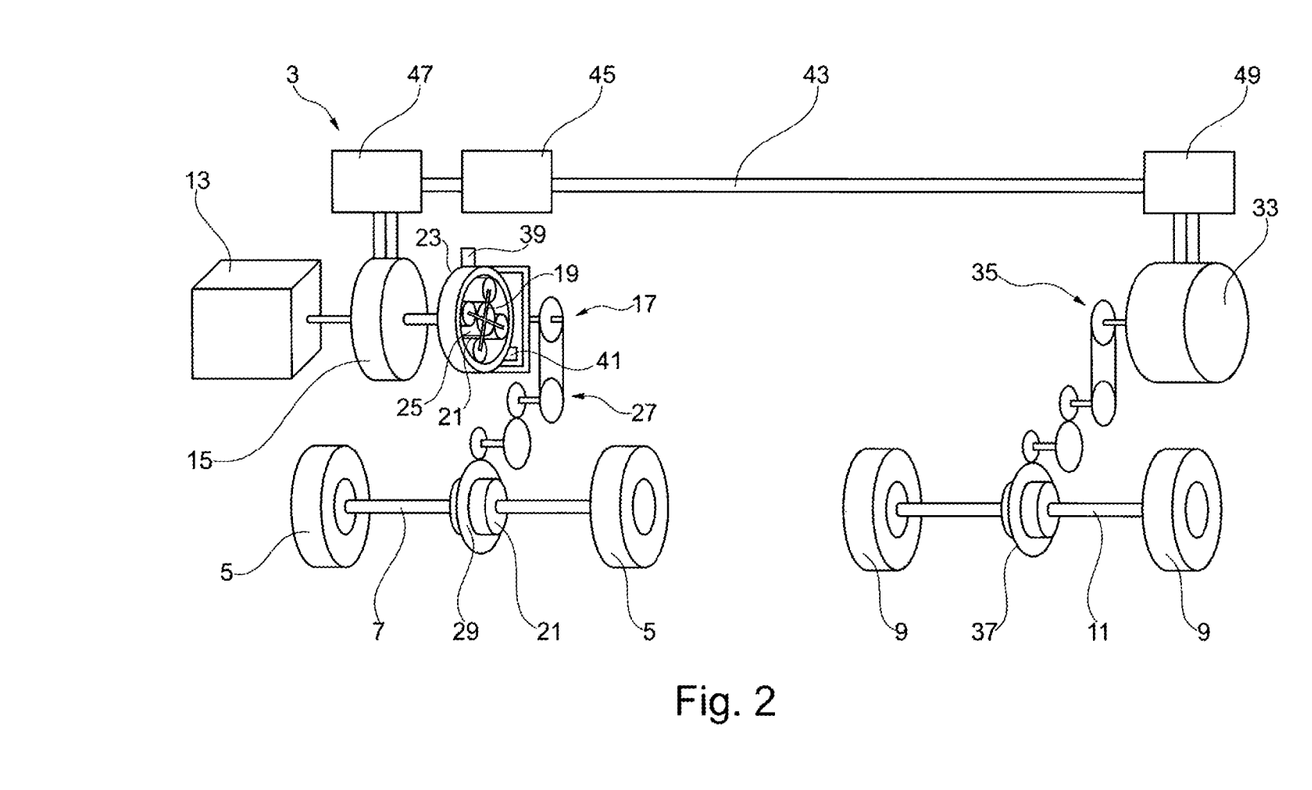
FIG. 2 is a schematic diagram of the drive system according to the first exemplary embodiment in a spatial illustration.

FIG. 2 shows the drive system 3 according to the first exemplary embodiment in a schematic spatial illustration.

FIG. 2 further clarifies the preferable structural and functional design of the drive system 3. The components already known from FIG. 1 are found in FIG. 2. The front drive axle 7 extends horizontally. The first wheel pair 5 is preferably assigned to the front drive axle 7. The rear drive axle 11 with the second wheel pair 9 assigned to it is illustrated next to the front drive axle 7. The terms front drive axle 7 and rear drive axle 11 are to be understood in a functional way here, i.e. the first wheel pair 5 and the second wheel pair 9 can be provided with independent wheel suspension, and be attached functionally in the same way as for rigid axles. The first differential 29 which is assigned to the front drive axle 7 permits, as a differential gear mechanism, the wheels of the first wheel pair 5 to rotate at different speeds. In an analogous fashion, a second differential 37 is provided assigned to the rear drive axle 11. The generator 15 and the first wheel pair 5 are coupled to the internal combustion engine 13, wherein the torque distribution takes place via the planetary gear mechanism 17.

The planetary gear mechanism 17 is described below. In this context, preferably three planetary gears 21 are rotatably arranged on a rotatable web element (spider) 19 of the planetary gear mechanism 17, with the result that their axes rotate on circular paths. In this exemplary embodiment, the planetary gears 21 preferably rotate about a sun gear 25, coupled to the output of the internal combustion engine 13, of the planetary gear mechanism 17 and are meshed therewith. In addition, the planetary gears 21 are preferably meshed with a ring gear 23, arranged in an axis-parallel fashion around the latter, with internal toothing. In this exemplary embodiment, a first brake 39 is preferably provided in order to brake the ring gear 23, and a second brake 41 is provided in order to brake the web element 19.

The planetary gear mechanism 17 therefore preferably permits a two-stage transmission ratio, with a first transmission ratio from the sun gear 25 to the rotatable web element 19 which rotatably holds the planetary gears 21 and a second transmission ratio to the ring gear 23. The planetary gear mechanism 17 therefore preferably acts as a distributor gear mechanism which distributes the power of the internal combustion engine 13 between the first wheel pair 5 and the generator 15.

The first downstep gear mechanism 27 which is arranged downstream of the planetary gear mechanism 17 preferably serves for reducing rotational speed for the drive of the first wheel pair 5.

The second wheel pair 9 is preferably driven by the electric motor 33 via the second gear mechanism 35. In this exemplary embodiment, the second gear mechanism 35 is embodied as a downstep gear mechanism for reducing the rotational speed.

Electrical energy generated by the generator 15 can preferably be fed to the electric motor 33 via an electrical line system 43. A battery 45 is preferably coupled electrically to the generator 15 for buffering energy generated by the generator 15. The battery 45 is preferably also electrically coupled to the electric motor 33, with the result that energy stored in the battery 45 can be output to the electric motor 33. A first converter 47, in particular for converting the alternating current generated by the generator 15 into direct current, is preferably intermediately connected between the battery 45 and the generator 15. The converter can also preferably serve for voltage adaptation. Preferably a second converter 49 for adapting the current and/or voltage is intermediately connected between the battery 45 and the electric motor 33.

Figure 3:
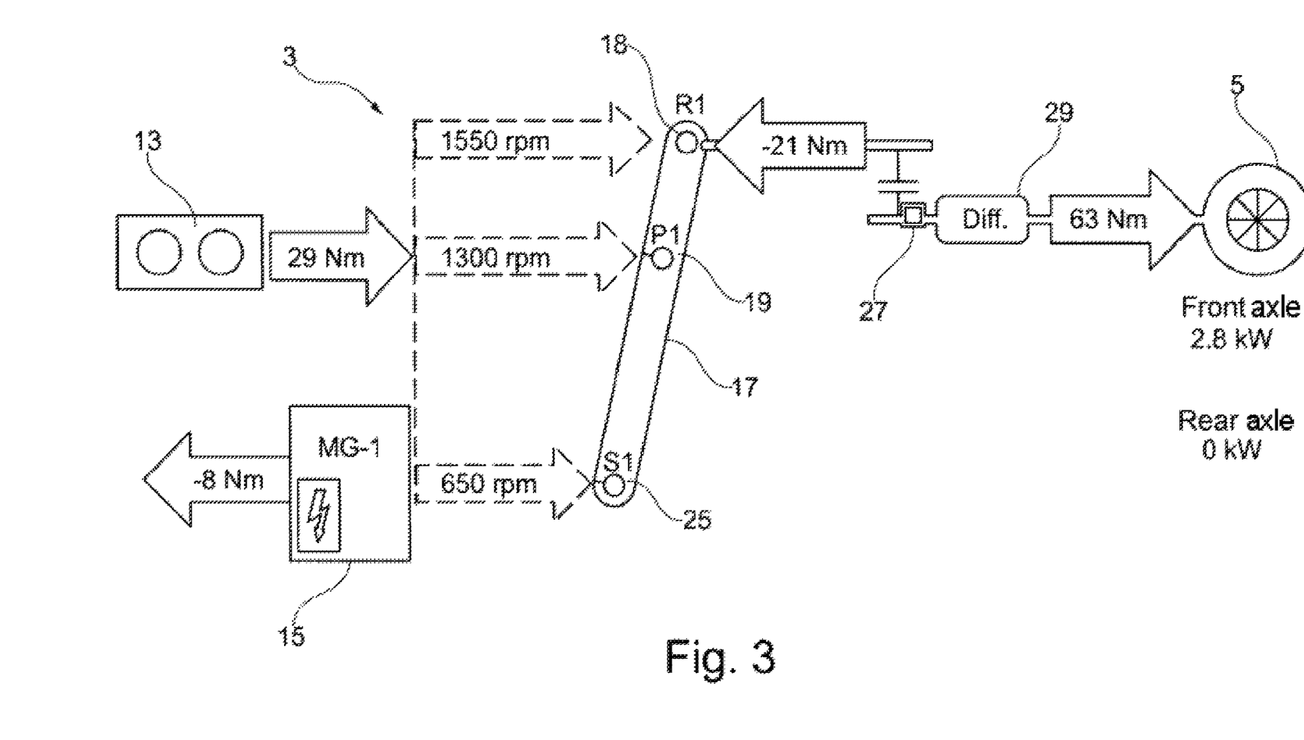
FIG. 3 illustrates the drive system according to the first exemplary embodiment in a first operating state.

FIG. 3 is a schematic view of the drive system 3 according to the first exemplary embodiment in a first operating state.

The internal combustion engine 13 is symbolized on the left in the figure by a rectangle and two circles therein. Obliquely to the right under the internal combustion engine 13, the generator 15 is illustrated as a rectangle. The first wheel pair 5 is indicated as a circle on the right in the figure. Between them there is the drive train with the transmission of force from the internal combustion engine 13 to the first wheel pair 5. The internal combustion engine 13 supplies here an output torque of 29 Nm at a rotational speed of 1300 rpm to the planetary gear mechanism 17, which is indicated by the arrows directed to the right. The planetary gear mechanism 17 is indicated by a bar running obliquely from bottom left to top right. The web element 19, symbolized as a circle, of the planetary gear mechanism 17 is rotated by the internal combustion engine 13 at the rotational speed of 1300 rpm. In the illustrated operating state of the drive device 3, the generator 15 hangs with a torque of −8 Nm, i.e. in a braking fashion, at the sun gear 25 of the planetary gear mechanism 17 at a rotational speed of 650 rpm. As a result, an electrical power of 0.5 KW can be made available by the generator 15. The first downstep gear mechanism 27 for driving the front wheel pair 5 brakes the ring gear 18 of the planetary gear mechanism 17 with a load torque of −21 Nm at a rotational speed of 1550 rpm. As a result of the downstepping by the first downstep gear mechanism 27, the torque is increased from 21 Nm to 63 Nm and is made available for driving the first wheel pair 5. This results in a drive power of 2.8 KW which is made available to drive the first wheel pair 5 at the front axle of the vehicle. In the illustrated operating state, no drive power is transmitted to the rear axle.

Figure 4:
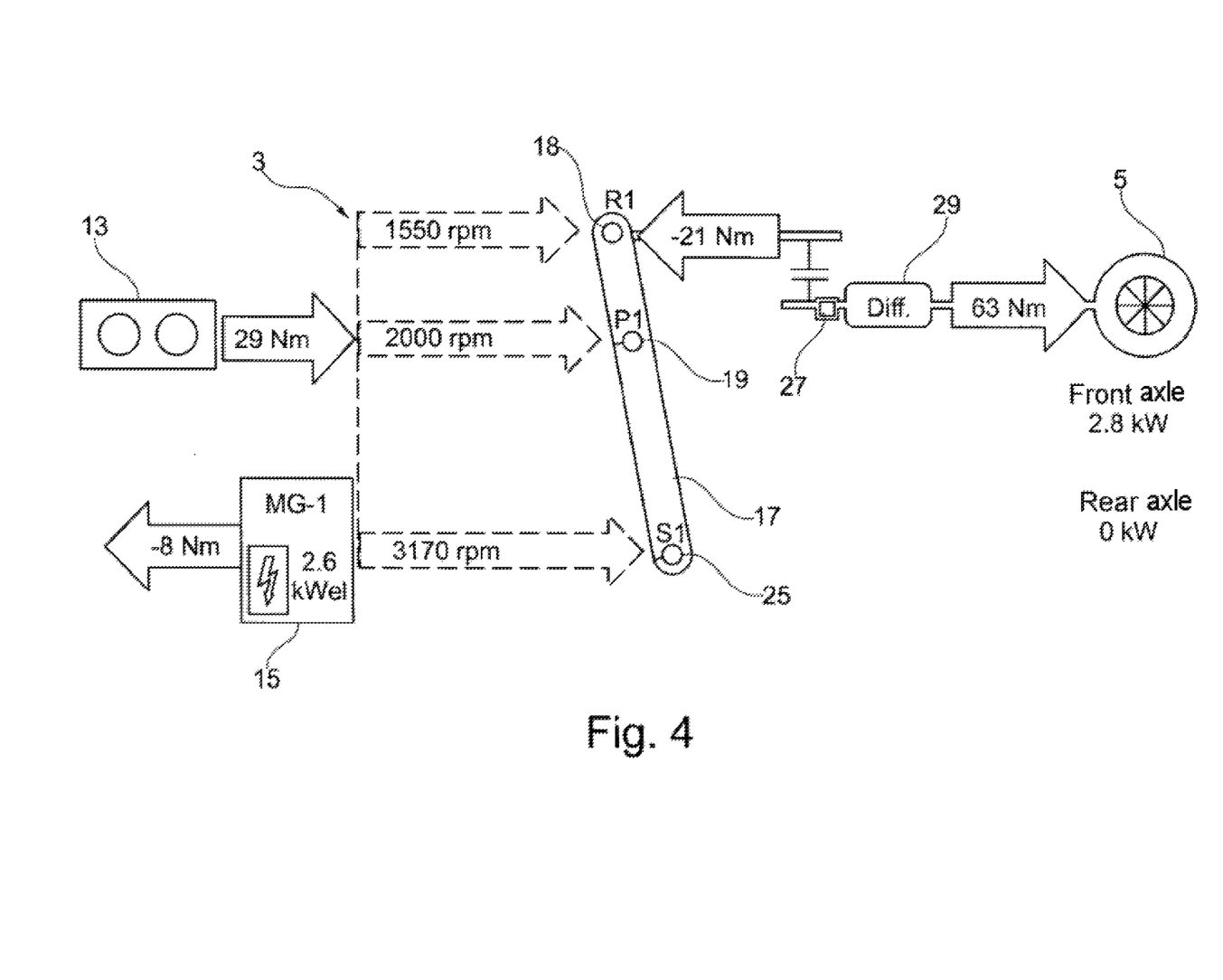
FIG. 4 illustrates the drive system according to the first exemplary embodiment in a second operating state.

FIG. 4 is a schematic view of the drive system 3 according to the first exemplary embodiment in a second operating state. The fundamental design of FIG. 4 corresponds to that in FIG. 3. The internal combustion engine 13 supplies here an output torque of 29 Nm at a rotational speed of 2000 rpm to the planetary gear mechanism 17, which is indicated by the arrows directed to the right. Therefore, the web element 19 of the planetary gear mechanism 17 is rotated by the internal combustion engine 13 at the rotational speed of 2000 rpm. In the illustrated operating state of the drive device 3, the generator 15 hangs with a torque of −8 Nm, i.e. in a braking fashion, at the sun gear 25 of the planetary gear mechanism 17 at a rotational speed of 3170 rpm. As a result of the increased rotational speed, the generator 15 can now make available a relatively high electrical power of 2.6 KW. The first downstep gear mechanism 27 for driving the first wheel pair 5 brakes the ring gear 18 of the planetary gear mechanism 17 with a load torque of −21 Nm at a rotational speed of 1550 rpm. As a result of the downstepping by means of the first downstep gear mechanism 27, the torque is increased from 21 Nm to 63 Nm and is made available for driving the first wheel pair 5. This results in a drive power of 2.8 KW which is made available for driving the first wheel pair 5 at the front axle of the vehicle. In the illustrated second operating state, no drive power is transmitted to the rear axle either.

Figure 5:
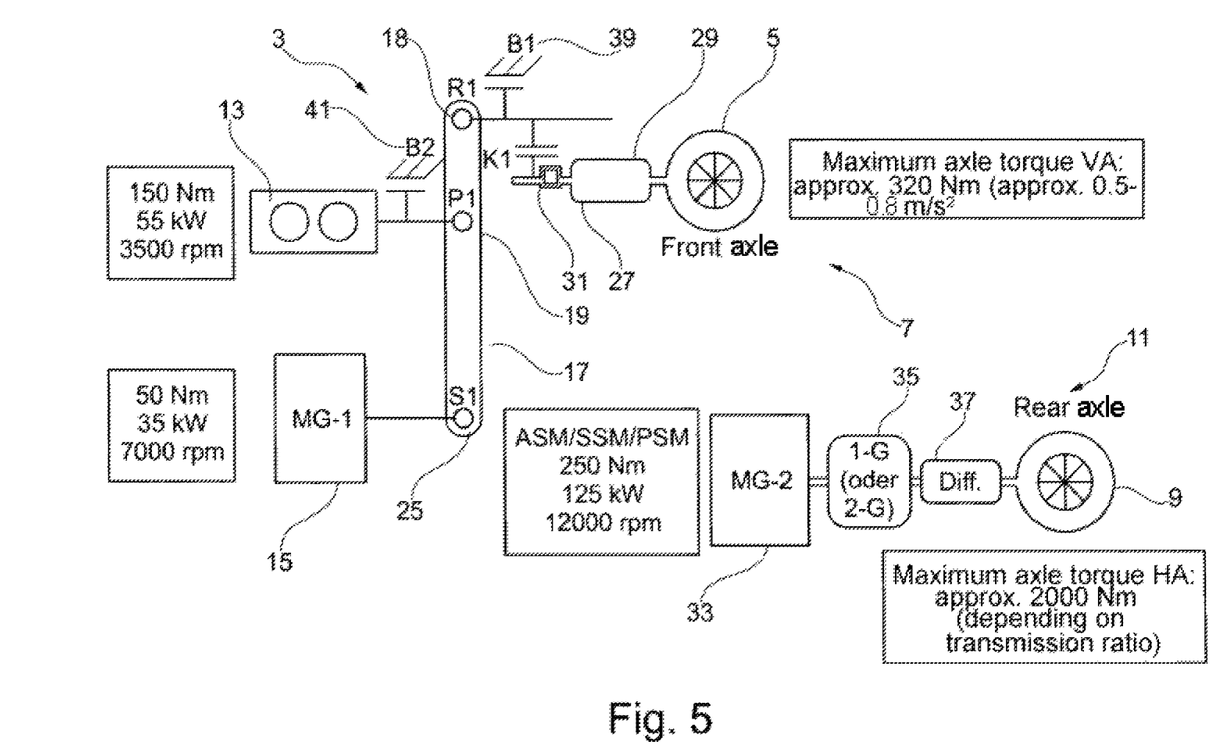
FIG. 5 illustrates the drive system according to the first exemplary embodiment in a third operating state.

FIG. 5 is a schematic view of the drive system 3 according to the first exemplary embodiment in a third operating state.

The internal combustion engine 13 supplies here an output torque of 150 Nm to the planetary gear mechanism 17 at a rotational speed of 3500 rpm. This corresponds to a drive power of 55 KW. The generator 15 is driven by the sun gear 25 of the planetary gear mechanism 17 with a torque of 50 Nm at a rotational speed of 7000 rpm. The generator 15 provides here an electrical power of 35 KW. A maximum drive torque of 320 Nm is fed to the front wheel pair 5 at the front drive axle (front axle) 7 from the planetary gear mechanism 17 via the ring gear 18 and the first downstep gear mechanism 27. The second wheel pair 9 at the rear drive axle 11 is driven by means of the electric motor 33, which in this operating state feeds a torque of 250 Nm and therefore a power of 125 KW at a rotational speed of 12000 rpm to a second gear mechanism 35 which is connected upstream of the second wheel pair 9 and is embodied as a downstep gear mechanism. A maximum torque of approximately 2000 Nm can therefore be implemented at the second wheel pair 9 of the rear axle 11 depending on the downstep ratio.

The operating strategy for the drive system 3 preferably provides three modes of operation:

Electric driving: Here, the motor vehicle 1 is driven by the electric motor 33, preferably via the second wheel pair 9 at the rear drive axle 11. The first wheel pair 5 at the front drive axle 7 is preferably uncoupled by way of the uncoupling device 31.

Load-maintaining state: Here, the motor vehicle 1 is preferably driven only with the internal combustion engine 13 via the first wheel pair 5, preferably at the front drive axle 7. The internal combustion engine 13 can preferably be started by operating the generator 15 as a motor when the first brake 39 is activated and the uncoupling device 31 is opened (all-wheel mode).

All-wheel mode: If the driving resistance becomes too large or a maximum tractive force is to be achieved, driving can preferably be effected both via the first wheel pair 5 and the second wheel pair 9. In this mode, the electric power which is generated by the generator 15 is preferably provided by adapting the rotational speed of the internal combustion engine 13, if appropriate the entire load can be reduced.

Charging mode: If the state of charge of the battery 45 is low and it is to be charged, a so-called serial mode can preferably ensure that the battery 45 is charged by way of the generator 15. The uncoupling device 31 is preferably opened here, the first brake 39 closed and the second brake 41 opened. The internal combustion engine 13 then drives the generator 15.

Starting mode: The internal combustion engine can preferably be started by the generator 15 when the uncoupling device 31 is opened. The uncoupling device 31 is preferably opened here, the first brake 39 closed and the second brake 41 opened. The internal combustion engine 13 then drives the generator 15.

Since the second wheel pair 9 preferably supplies no drive torque at the rear drive axle 11 in the load-maintaining state mode at constant speeds and consequently it is merely entrained, the electric motor 33 can preferably be uncoupled. If a shiftable gear mechanism is installed at the rear drive axle 11, this can preferably be brought about by virtue of the fact that the gear mechanism is shifted free of frictional engagement (neutral gear speed). If no shiftable gear mechanism is installed, a design as an electric motor 33 can advantageously be used which produces low drag losses, preferably an asynchronous machine or an externally excited synchronous machine.

LIST OF REFERENCE NUMBERS

1 Motor vehicle
3 Drive system
5 First wheel pair
7 Front drive axle
9 Second wheel pair
11 Rear drive axle
13 Internal combustion engine
15 Generator
17 Planetary gear mechanism
19 Web element (spider)
21 Planetary gears
23 Ring gear
25 Sun gear
27 First downstep gear mechanism
29 First differential
31 Uncoupling device
33 Electric motor
35 Second gear mechanism
37 Second differential
39 First brake
41 Second brake
43 Electrical line system
45 Battery
47 First converter
49 Second converter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive system for a motor vehicle, comprising:
   a first wheel pair;
   a second wheel pair;
   an internal combustion engine which is coupled to the first wheel pair;
   a generator which is operatable as an electric motor and is coupled to the internal combustion engine and to the first wheel pair, the first wheel pair being driven by the internal combustion engine and the electric motor;
   an electric motor which is coupled to the second wheel pair and is configured to convert energy generated by the generator into mechanical energy, the second wheel pair being driven by the electric motor; and
   a planetary gear mechanism via which the internal combustion engine is coupled to the generator and to the first wheel pair;
   wherein the drive system is switchable into at least the following modes of operation:
   (a) driving only the second wheel pair by the electric motor, wherein the internal combustion engine is uncoupled from the first wheel pair by an uncoupling device;
   (b) driving the first wheel pair by the internal combustion engine or driving the first wheel pair by the internal combustion engine and driving the second wheel pair by the electric motor;
   (c) driving the generator by the internal combustion engine, wherein the first wheel pair is uncoupled from the internal combustion engine by the uncoupling device, and the second wheel pair is uncoupled from the electric motor;
   (d) driving both wheel pairs by the electric motor and the generator;
   (e) starting the internal combustion engine by the generator, wherein the first wheel pair is uncoupled by the uncoupling device.

2. The drive system according to claim 1, wherein the first wheel pair is assigned to a front drive axle, and the second wheel pair is assigned to a rear drive axle.

3. The drive system according to claim 1, further comprising:
   a battery for storing and outputting energy, the battery being connected to the generator and the electric motor.

4. The drive system according to claim 1, further comprising:
   a first brake for braking a ring gear of the planetary gear mechanism.

5. The drive system according to claim 4, further comprising:
   a second brake for braking a web element of the planetary gear mechanism.

6. The drive system according to claim 1,
   wherein the uncoupling device is connected between the internal combustion engine and the first wheel pair.

7. The drive system according to claim 6, wherein the uncoupling device is arranged connected between a first differential, assigned to the first wheel pair, and the first wheel pair.

8. The drive system according to claim 6, wherein the uncoupling device is provided as a wheel hub clutch on the first wheel pair.

9. The drive system according to claim 6, wherein the uncoupling device is arranged connected between the internal combustion engine and a first differential provide assigned to the first wheel pair.

10. A method for operating a drive system, equipped with a first wheel pair; a second wheel pair; an internal combustion engine which is coupled to the first wheel pair;
    a generator which is operatable as an electric motor and is coupled to the internal combustion engine and to the first wheel pair, the first wheel pair being driven by the internal combustion engine and the electric motor; an electric motor which is coupled to the second wheel pair and is configured to convert energy generated by the generator into mechanical energy, the second wheel pair being driven by the electric motor; and a planetary gear mechanism via which the internal combustion engine is coupled to the generator and to the first wheel pair,
    the method comprising:
    (a) driving only the second wheel pair by the electric motor, wherein the internal combustion engine is uncoupled from the first wheel pair by an uncoupling device;
    (b) driving the first wheel pair by the internal combustion engine or driving the first wheel pair by the internal combustion engine and driving the second wheel pair by the electric motor;
    (c) driving the generator by the internal combustion engine, wherein the first wheel pair is uncoupled from the internal combustion engine by the uncoupling device, and the second wheel pair is uncoupled from the electric motor;
    (d) driving the first wheel pair by the electric motor and the second wheel pair by the generator;
    (e) starting the internal combustion engine by the generator, wherein the first wheel pair is uncoupled by means of the uncoupling device.

11. The method according to claim 10, wherein in the mode of operation (b), outputting of energy by the generator is controlled by adjusting a rotational speed of the internal combustion engine.

\* \* \* \* \*